United States Patent
Oh et al.

(10) Patent No.: US 12,116,482 B2
(45) Date of Patent: Oct. 15, 2024

(54) RACING TIRE RUBBER COMPOSITION AND METHOD FOR MANUFACTURING SAME

(71) Applicant: KOREA KUMHO PETROCHEMICAL CO., LTD., Seoul (KR)

(72) Inventors: Dong Hoon Oh, Daejeon (KR); Namsun Choi, Daejeon (KR); Young Woo Lim, Gwangju (KR)

(73) Assignee: KOREA KUMHO PETROCHEMICAL CO., LTD., Seoul (KR)

( * ) Notice: Subject to any disclaimer, the term of this patent is extended or adjusted under 35 U.S.C. 154(b) by 664 days.

(21) Appl. No.: 17/292,740

(22) PCT Filed: Nov. 11, 2019

(86) PCT No.: PCT/KR2019/015289
§ 371 (c)(1),
(2) Date: May 11, 2021

(87) PCT Pub. No.: WO2020/101309
PCT Pub. Date: May 22, 2020

(65) Prior Publication Data
US 2021/0395498 A1   Dec. 23, 2021

(30) Foreign Application Priority Data
Nov. 12, 2018 (KR) .................. 10-2018-0138397

(51) Int. Cl.
*C08L 9/06* (2006.01)
*B60C 1/00* (2006.01)
*C08J 3/22* (2006.01)
*B82Y 30/00* (2011.01)
*B82Y 40/00* (2011.01)

(52) U.S. Cl.
CPC ........ *C08L 9/06* (2013.01); *B60C 1/00* (2013.01); *C08J 3/226* (2013.01); *B82Y 30/00* (2013.01); *B82Y 40/00* (2013.01); *C08J 2309/06* (2013.01); *C08L 2207/322* (2013.01); *C08L 2310/00* (2013.01)

(58) Field of Classification Search
CPC .......... C08L 9/06; C08L 2310/00; C08L 9/00; C08L 9/02; C08L 21/00; C08L 51/00; B60C 1/00; B60C 1/0016; C08J 3/226; C08J 2309/06; C08J 2309/08; B82Y 30/00; B82Y 40/00; C08K 3/04; C08K 3/041
USPC ........................................................ 524/496
See application file for complete search history.

(56) References Cited

U.S. PATENT DOCUMENTS

| | | | | |
|---|---|---|---|---|
| 11,441,006 B2 * | 9/2022 | Choi | ..................... | C01B 32/162 |
| 2011/0146859 A1 * | 6/2011 | Schmitz | ................. | C08K 3/041 |
| | | | | 252/511 |
| 2016/0152805 A1 * | 6/2016 | Jasiunas | ................ | B60C 1/0016 |
| | | | | 523/156 |
| 2017/0226233 A1 * | 8/2017 | Yamashiro | ............ | B60C 1/0016 |

FOREIGN PATENT DOCUMENTS

| | | |
|---|---|---|
| JP | 5946675 B2 | 7/2016 |
| KR | 10-2010-0030903 A | 3/2010 |
| KR | 10-2014-0069584 A | 6/2014 |
| KR | 10-2015-0045169 A | 4/2015 |
| KR | 10-2018-0101223 A | 9/2018 |

OTHER PUBLICATIONS

English Translation of KR 10-2018-0101223 (Year: 2018).*
English Translation of KR 10-2010-0030903 (Year: 2010).*

* cited by examiner

*Primary Examiner* — Hannah J Pak
(74) *Attorney, Agent, or Firm* — NKL Law; Jae Youn Kim

(57) ABSTRACT

An embodiment of the present invention provides a racing tire rubber composition comprising: 30-60 wt % of rubber, 10-30 wt % of carbon black, 1-20 wt % of carbon nanotubes, and 10-50 wt % of oil; and a method for manufacturing same.

14 Claims, No Drawings

RACING TIRE RUBBER COMPOSITION AND METHOD FOR MANUFACTURING SAME

TECHNICAL FIELD

The present invention relates to a rubber composition for a racing tire and a method of manufacturing the same, and more particularly, to a rubber composition for a racing tire having improved grip properties during high-speed driving due to having improved heat generation characteristics and a method of manufacturing the same.

BACKGROUND ART

In regard to the manufacture of a racing tire tread rubber composition, research has been conducted to improve heat generation characteristics by using carbon black having a small particle diameter and thereby improve grip properties on the road surface.

Korean Patent Registration No. 10-0798359 discloses that when two types of carbon black having different particle diameters are used, improved grip properties can be imparted as compared to when a single type of carbon black having the same particle diameter is used. However, when two types of carbon black are used, since an excessive amount of carbon black is included in a tire, the weight of the tire and manufacturing costs may increase, and the weight of a vehicle equipped with such a tire increases, which leads to a decrease in the vehicle's intrinsic dynamic performance.

Korean Patent Registration No. 10-1119601 discloses a tire tread rubber composition manufactured using ultrafine carbon black particles treated with a hydroxyl group in order to solve the problem of an increasing tire weight, but there was a problem of incurring additional costs for the surface treatment of carbon black.

To this end, tire rubber compositions including carbon nanotubes which are lighter than carbon black and have excellent heat generation characteristics have been proposed. In general, when the viscoelastic properties of a tire manufactured using carbon nanotubes as a rubber filler are measured, it is observed that heat builds up at the interface between rubber and carbon nanotubes, degrading the fuel economy characteristics of the tire. However, in racing tires where high fuel economy characteristics are less important a rapid increase in temperature is required, such a phenomenon can be properly used, and thus carbon nanotubes can be used as a rubber filler for racing tires.

On the other hand, since a large amount of carbon nanotubes should be used to impart required levels of heat generation characteristics and grip properties to racing tires, improving the dispersibility of carbon nanotubes in a rubber composition remains a challenge.

DISCLOSURE

Technical Problem

The present invention is directed to providing a rubber composition for a racing tire having significantly improved heat generation characteristics and grip properties due to including an excessive amount of uniformly dispersed carbon nanotubes and a method of manufacturing the same.

Technical Solution

One aspect of the present invention provides a racing tire rubber composition, which includes rubber at 30 to 60% by weight, carbon black at 10 to 30% by weight, carbon nanotubes at 1 to 20% by weight, and an oil at 10 to 50% by weight.

In one embodiment, the rubber may be one selected from the group consisting of acrylonitrile-butadiene rubber, ethylene-propylene-diene rubber, styrene-butadiene rubber, butadiene rubber, natural rubber, isoprene rubber, butyl rubber, and a combination of two or more thereof.

In one embodiment, the carbon black may include first carbon black having an iodine adsorption amount of 100 to 130 mg/g and a dibutyl phthalate (DIP) oil absorption amount of 115 to 135 ml/100 g and second carbon black hay g iodine adsorption amount of 120 to 140 mg/g and a DBP oil absorption amount of 120 to 145 ml/100 g.

In one embodiment, in the carbon black, the first carbon black and the second carbon black may be mixed in a weight ratio of 1:0.05 to 0.5.

In one embodiment, the carbon nanotubes may be bundle-type carbon nanotubes in which a plurality of multi-walled carbon tubes having an average diameter of 5 to 50 nm are aggregated in a lengthwise direction.

In one embodiment, the bundle-type carbon nanotubes may have an average bundle diameter of 0.1 to 10 μm and an average bundle length of 10 to 200 μm.

In one embodiment, the multi-walled carbon nanotubes may have a Raman spectral intensity ratio ($I_G/I_D$) of 0.5 to 1.5.

In one embodiment, the multi-walled carbon nanotubes may have an apparent density of 0.005 to 0.120 g/ml.

In one embodiment, the multi-walled carbon nanotubes may have a carbon (C) content of 90% by weight or more.

Another aspect of the present invention provides a method of manufacturing a racing tire rubber imposition, which includes: (a) preparing a masterbatch by mixing 100 parts by weight of a first rubber with 10 to 100 parts by weight of carbon nanotubes and 50 to 500 parts by weight of an oil; and (b) diluting the masterbatch by mixing the masterbatch with a second rubber, carbon black, and an oil so that the carbon nanotube content of the rubber composition is 1 to 20% by weight.

In one embodiment, the first rubber and the second rubber may be one selected from the group consisting of acrylonitrile-butadiene rubber, ethylene-propylene-diene rubber, styrene-butadiene rubber, butadiene rubber, natural rubber, isoprene rubber, butyl rubber, and a combination ore thereof.

In one embodiment, the carbon black may include first carbon black having an iodine adsorption amount of 100 to 130 mg/g and a DBP oil absorption amount of 115 to 135 ml/100 g and second carbon black having an iodine adsorption amount of 120 to 140 mg/g and a DBP oil absorption amount of 120 to 145 ml/100 g.

In one embodiment, in the carbon black, the first carbon black and the second carbon black may be mixed in a weight ratio of 1:0.05 to 0.5.

In one embodiment, the carbon nanotubes may be bundle-type carbon nanotubes in which a plurality of multi-walled carbon nanotubes having an average diameter of 5 to 50 nm are aggregated in a lengthwise direction.

In one embodiment, the bundle-type carbon nanotubes may have an average bundle diameter of 0.1 to 10 μm and an average bundle length of 10 to 200 μm.

In one embodiment, the multi-walled carbon nanotubes may have a Raman spectral intensity ratio ($I_G/I_D$) of 0.5 to 1.5.

In one embodiment, the multi-walled carbon nanotubes may have an apparent density of 0.005 to 0.120 g/ml.

In one embodiment, the multi-walled carbon nanotubes may have a carbon (C) content of 90% by weight or more.

Advantageous Effects

According to one aspect of the present invention, by using a predetermined amount of carbon nanotubes as a filler for a racing tire rubber composition, it is possible to improve the heat generation characteristics and grip properties of a racing tire and thus improve the dynamic performance of a racing vehicle.

However, it should be understood that the effects of the present invention are not limited to the above-described effects and include all effects that can be deduced from the configuration of the invention described in the detailed description of the invention or the scope of the appended claims.

Modes of the Invention

Hereinafter, the present invention will be described. However, the present invention may be implemented in various different forms and thus is not limited to the embodiments described herein.

Throughout the present specification, when it is stated that a part is "connected" with another part, this includes not only cases where the parts are "directly connected" with each other but also cases where the parts are "indirectly connected" with each other through a member interposed therebetween. In addition, when it is stated that a part "includes," "comprises," or "contains" a component, this means that the part may include, rather than exclude, other additional components, unless explicitly stated to the contrary.

Racing Tire Rubber Composition

One aspect of the present invention provides a racing tire rubber composition, which includes rubber at 30 to 60% by weight, carbon black at 10 to 30% by weight, carbon nanotubes at 1 to 20% by weight, and an oil at 10 to 50% by weight.

The rubber may function as a dispersion medium or matrix for carbon black and carbon nanotubes, which are particulate components, in the tire rubber composition. As used herein, the term "matrix" refers to a component that forms a continuous phase in a composition including two or more components.

The rubber may be one selected from the group consisting of acrylonitrile-butadiene rubber, ethylene-propylene-diene rubber, styrene-butadiene rubber, butadiene rubber, natural rubber, isoprene rubber, butyl rubber, and a combination of two or more thereof, and is preferably styrene-butadiene rubber and more preferably emulsion styrene-butadiene rubber, but the present invention is not limited thereto.

The carbon black may include two or more types of carbon black having different average particle sizes and/or surface areas. When two or more types of carbon black having different average particle sizes and/or surface areas are mixed, since smaller carbon black particles are oriented in voids formed between larger carbon black particles, heat generation is suppressed when a relatively small external stress is applied during driving and increased when a relatively large external stress is applied during braking and driving, and therefore, grip properties and durability are improved.

For example, the carbon black may include first carbon black having an iodine adsorption amount 100 to 130 mg/g and a DBP oil absorption amount of 115 to 135 ml/100 g and second carbon black having an iodine adsorption amount of 120 to 140 mg/g and a DBP oil absorption amount of 120 to 145 ml/100 g. The first carbon black and the second carbon black may be mixed in a weight ratio of 1:0.05 to 0.5.

When the weight of the second carbon black is less than 0.05 parts by weight relative to 1 part by weight of the first carbon black, the above-described effects are insignificant, and when the weight of the second carbon black is more than 0.5 parts by weight relative to 1 part by weight of the first carbon black, a dynamic is loss coefficient (Tan δ) during braking is significantly increased, but a dynamic loss coefficient during driving is also significantly increased, and since excessive heat is generated during driving, durability may be significantly degraded.

The carbon black content of the tire rubber composition may be 10 to 30% by weight and preferably 20 to 29% by weight. When the carbon black content s less than 10% by weight, since a dynamic loss coefficient during braking is not sufficiently large, there is a limit to the improvement in grip properties, and when the carbon black content is more than 30% by weight, since a dynamic loss coefficient during driving is excessively large, durability may be significantly degraded.

The carbon nanotubes are a material used for imparting heat generation characteristics, grip properties, mechanical properties, dynamic properties, and durability to a rubber matrix, and when a tire is manufactured by molding a rubber composition including the carbon nanotubes, heat characteristics can be improved, and accordingly, grip properties can be improved.

Specifically, when the carbon nanotubes are mixed with a rubber matrix, since individual carbon nanotubes are dispersed in the rubber matrix and connected with one another to form a continuous three-dimensional network structure, excellent heat generation characteristics are exhibited.

The carbon nanotubes may be synthesized by an arc-discharge method, a pyrolysis method, a laser vaporization method, a plasma chemical vapor deposition method, a thermal chemical vapor deposition method, or the like, but any synthetic carbon nanotubes can be used regardless of the synthesis method.

In addition, in terms of the number of walls, the carbon nanotubes may be one selected from the group consisting of single-walled carbon nanotubes, double-walled carbon nanotubes, multi-walled carbon nanotubes, cup-stacked carbon nanofibers in which a plurality of truncated graphene are stacked, and a combination of two or more thereof, and are preferably bundle-type carbon nanotubes in which a plurality of multi-walled carbon nanotubes having an average (outer) diameter of 5 to 50 nm are aggregated in a lengthwise direction, but the present invention is not limited thereto. The outer diameter refers to a diameter of the cross-section of a carbon nanotube including a graphite layer forming the wall of the carbon nanotube, and an inner diameter refers to a diameter of a hollow cross-section excluding the graphite layer.

When the average diameter of the multi-walled carbon nanotubes is less than 5 nm or more than 50 nm, since the average bundle diameter of a bundle-type carbon nanotube formed by the aggregation of the multi-walled carbon nanotubes cannot be adjusted to be within a range to be described below, it is preferable that multi-walled carbon nanotubes having the above-described diameter range are used. As used herein, the term "bundle-type" refers to a form in which a plurality of carbon nanotubes are aggregated while being arranged side by side in a lengthwise direction or in a rope form. On the other hand, "non-bundle type" refers to a form in which a plurality of carbon nanotubes are present without forming a specific structure.

The carbon nanotubes may be in the form of pellets produced by mechanically and physically compressing powdery carbon nanotubes. When the carbon nanotubes are in a pellet form, a working environment is improved because powder scattering in subsequent processes is prevented.

Meanwhile, among the methods for analyzing the structure of the carbon nanotubes, a Raman spectroscopy method capable of analyzing surface conditions of the carbon nanotubes can be useful. As used herein, the term "Raman spectroscopy method" refers to a spectroscopy method utilizing the Raman effect, which is a phenomenon that when a molecule is irradiated with monochromatic excitation light such as laser light, scattered light whose frequency differs from that of the excitation light as much as the vibration frequency of the molecule generated, in order to determine the vibration frequency of the molecule, and the Raman spectroscopy method can be used for quantitatively measuring the crystallinity of the carbon nanotubes.

In a Raman spectrum of the carboy nanotubes, a peak present in an area corresponding to a wavenumber of $1,580\pm50$ cm$^{-1}$ is referred to as a G band, and the G band represents an sp$^2$ bond of the carbon nanotubes and indicates the presence of a carbon crystal without structural defects. On the other hand, a peak present in an area corresponding to a wavenumber of $1,360\pm5$ cm$^{-1}$ is referred to as a D band, and the D band represents an sp$^3$ bond of the carbon nanotubes and indicates the presence of carbon having structural defects.

Furthermore, the peak values of the G band and the D band are referred to as $I_G$ and $I_D$, respectively, and a ratio the therebetween known as a Raman spectral intensity ratio ($I_G/I_D$) can be used for quantitatively measuring the crystallinity of the carbon nanotubes. That is, higher Raman spectral intensity ratios mean that the carbon nanotubes have fewer structural defects. Therefore, when carbon nanotubes having a high Raman spectral intensity ratio are used, excellent heat generation characteristics can be realized.

For example, the multi-walled carbon nanotubes may have a Raman spectral intensity ratio ($I_G/I_D$) of 0.5 to 1.5 and preferably 0.9 to 1.3. When the $I_G/I_D$ of the carbon nanotubes is less than 0.5, since a large amount of amorphous carbon is included, the crystallinity of the carbon nanotubes is low, and therefore, when the carbon nanotubes are mixed with a rubber matrix, the effect of improving properties may be insignificant.

In addition, when the carbon (C) content of the multi-walled carbon nanotubes is high, there are few impurities, such as catalysts, so excellent properties can be realized. Therefore, the carbon content of the carbon nanotubes may be 90% or more, preferably 93 to 99%, and more preferably 95 to 99%.

When the carbon content of the multi-walled carbon nanotubes is less than 90%, structural defects of the carbon nanotubes may be caused, and thus crystallinity may be lowered, and the carbon nanotubes may be easily cut and destroyed by an external impact.

Meanwhile, the multi-walled carbon nanotubes may have an apparent density of 0.005 to 0.120 g/ml.

The bundle-type carbon nanotubes may be dispersed in a rubber matrix and form a three-dimensional network structure, and the more robust the network structure is, the more heat generation characteristics, grip properties, mechanical properties, dynamic properties, and durability can be improved. In particular, a robust network structure can be formed by adjusting the average bundle diameter and average bundle length of the bundle-type carbon nanotubes to be within predetermined ranges. In this case, when the average bundle diameter of the bundle-type carbon nanotubes is less than 0.1 μm or the average bundle length is more than 200 μm, since dispersibility is reduced, heat generation characteristics, grip properties, mechanical properties, dynamic properties, and durability may not be uniform in different portions of a tire manufactured from the rubber composition, and when the average bundle diameter is more than 10 μm or the average bundle length is less than 10 μm, since the stability of the network structure is reduced, heat generation characteristics, grip properties, mechanical properties, dynamic properties, and durability may be degraded.

The carbon nanotube content of the tire rubber composition may be 1 to 20% by weight, preferably 2 to 20% by weight, and more preferably 4 to 10% by weight. When the carbon nanotube content is less than 1% by weight, the levels of heat generation characteristics, mechanical properties, grip properties, dynamic properties, and durability required for a tire cannot be provided, and when the carbon nanotube content is more than 20% by weight, the dispersibility of the carbon nanotubes may be reduced, and there is a disadvantage in terms of economic efficiency.

Meanwhile, the tire rubber composition may further include a known component or additive commonly included in a tire rubber composition, such as silica, a fatty acid, a metal oxide, sulfur, a coupling agent, a crosslinking accelerator, or an antioxidant, as necessary.

Method of Manufacturing Racing Tire Rubber Composition

Another aspect of the present invention provides a method of manufacturing a racing tire rubber composition, which includes: (a) preparing a masterbatch by mixing 100 parts by weight of a first rubber with 10 to 100 parts by weight of carbon nanotubes and 50 to 500 parts by weight of an oil; and (b) diluting the masterbatch by mixing the masterbatch with a second rubber, carbon black, and an oil so that the carbon nanotube content of the rubber composition is 1 to 20% by weight.

In step (a), a masterbatch may be prepared by mixing 100 parts by weight of a first rubber with 10 to 100 parts by weight of carbon nanotubes and 50 to 500 parts by weight of an oil. As used herein, the term "masterbatch," in the case of making a rubber composition, refers to a material prepared in advance by dispersing a large amount of carbon nanotubes. When this masterbatch is prepared, since the dispersibility of carbon nanotubes in a ribber matrix can be improved, heat generation characteristics, grip properties, mechanical properties, dynamic properties, and durability can be uniform in different portions of a tire manufactured from the rubber composition.

The masterbatch, which is a product of step (a), may have high carbon nanotube content. For example, in the masterbatch, the amount of carbon nanotubes may be 10 to 100 parts by weight and preferably 20 to 60 parts by weight relative to 100 parts by weight of the first rubber.

When the amount of carbon nanotubes is less than 10 parts by weight, the concentration of carbon nanotubes is low, and when the amount of carbon nanotubes is more than 100 parts by weight, since the composition of the obtained masterbatch is not uniform, processability may be significantly reduced.

In step (a), the masterbatch may be prepared in a sphere form, pellet form, sheet form, or the like, but there are no restrictions regarding the form the masterbatch should be prepared in as long as the mixing of the masterbatch with rubber in the subsequent step (b) can improve the dispersibility of the carbon nanotubes.

In particular, the masterbatch may not be a mere mixture of rubber and carbon nanotubes and may be prepared in the form of a sheet by additionally press-molding the mixture. As described above, the carbon nanotubes added in step (a) may be in the form of pellets produced by compressing powdery carbon nanotubes, and when the pellets are mixed with rubber in step (a), the dispersibility of the carbon nanotubes in the rubber may be low. Therefore, the dispersibility can be improved by physically pressing the carbon nanotube pellets that are not dispersed after mixing but remain aggregated.

The pressing may be achieved by passing the mixture between a roller and a transfer plate spaced apart from each other by a predetermined distance or between a pair of rollers spaced apart from each other by a predetermined distance, and through this, the mixture can be deformed into a sheet form. In this case, in consideration of the tensile properties of the pressed product (i.e., sheet) and the dispersibility of carbon nanotubes in the sheet, the above distance may be adjusted to be within the range of 0.1 to 2.0 mm and preferably 0.5 to 2.0 mm.

The shapes, types, structures, sizes, properties, contents, and effects of the carbon nanotubes are the same as described above.

In step (b), the masterbatch may be diluted by mixing the masterbatch with a second rubber, carbon black, and on oil so that the carbon nanotube content of a rubber composition is 1 to 20% by weight, and as a result, a tire rubber composition is obtained. The amount of rubber additionally added in step (b) is sufficient if it allows the carbon nanotube concentration of the finally obtained rubber composition to be reduced to be within the above-described range.

The first rubber and the second rubber may be the same or different and may be, for example, one selected from the group consisting of acrylonitrile-butadiene rubber, ethylene-propylene-diene rubber, styrene-butadiene rubber, butadiene rubber, natural rubber, isoprene rubber, butyl rubber, and a combination of two or more thereof, and is preferably styrene-butadiene rubber and more preferably emulsion styrene-butadiene rubber, but the present invention is not limited thereto.

The carbon black may include first carbon black having an iodine adsorption amount of 100 to 130 mg/g and a DBP oil absorption amount of 115 to 135 ml/100 g and second carbon black having an iodine adsorption amount of 120 to 140 mg/g and a DBP oil absorption amount of 120 to 145 ml/100 g, and in the carbon black, the first carbon black and the second carbon black may be mixed in a weight ratio of 1:0.05 to 0.5. The effects that can be realized by mixing the two or more types of carbon black having different average particle size and/or surface areas are the same as described above.

Meanwhile, in step (b), a known component or additive commonly included in a tire rubber composition, such as silica, a fatty acid, a metal oxide, sulfur, a coupling agent, a crosslinking accelerator, or an antioxidant, as necessary.

The fatty acid may function as a dispersing agent capable of preventing aggregation by coating the carbon nanotubes and inducing a repulsive force therebetween. In addition, the fatty acid may suppress the possible generation of frictional heat between the carbon nanotubes by acting as a lubricant capable of suppressing friction between the carbon nanotubes and may thereby suppress damage to the tire.

For example, the fatty acid may be one selected from the group consisting of butyric acid, caproic acid, caprylic acid, capric acid, lauric acid, myristic acid, palatine acid, stearic acid, linoleic acid, α-linolenic acid, arachidic acid, behenic acid, erucic acid, oleic acid, and a combination of two or more thereof, and is preferably stearic acid, but the present invention is not limited thereto. In addition, the metal oxide may be one selected from the group consisting of zinc oxide, magnesium oxide, tin oxide, calcium oxide, and a combination of two or more thereof, and is preferably zinc oxide which is eco-friendly, but the present invention is not limited thereto.

In addition, the sulfur and the crosslinking accelerator may provide required mechanical properties to a final product by crosslinking the rubber matrix.

For example, the crosslinking accelerator may be one selected from the group consisting of aldehyde amine, guanidine, thiazole, sulfenamide, dithiocarbamate, thiuram, thiourea, and a combination of two or more thereof, and is preferably N-t-butyl-2-benzothiazolesulfenamide (TBBS), 2-mercaptobenzothiazole (MBT), tetramethylthiuram disulfide (TMTD), diphenylguanidine (DPG), N-cyclohexyl-2-benzothiazolesulfenamide (CBS), or a combination of two or more thereof, but the present invention is not limited thereto.

Hereinafter, exemplary embodiments of the present invention will be described in detail.

EXAMPLES 137.5 parts by weight of styrene-butadiene rubber (emulsion SBR (E-SBR) expanded by mixing with 37.5 PHR of a treated distillate aromatic extract (TDAE) oil) was introduced into a 0.5 liter Banbury mixer and stirred for one minute at 50° C. and a rotation speed of 40 rpm, and 50 parts by weight of bundle-type carbon nanotubes (average bundle diameter: 2.4 μm, average bundle length: 30 μm), in which multi-walled carbon nanotubes (MWCNTs) having an average diameter of 13 nm, an apparent density of 0.025 g/ml, a Raman spectral intensity ratio ($I_G/I_D$) of 0.94 to 1.22, and a carbon (C) content of 95% by weight are aggregated in a lengthwise direction, and 50 parts by weight of a TDAE oil were added and stirred for three minutes at a rotation speed of 45 rpm and additionally stirred for three minutes at a rotation speed of 60 rpm. The mixed blend was added to an open roller with a 1 mm gap and subjected to three cycles of each of lowering and triangular folding, and then molded into a sheet to prepare a masterbatch.

The above masterbatch and styrene-butadiene rubber, zinc oxide, stearic acid, carbon black (N134, N234), and a TDAE oil were introduced to a Banbury mixer and kneaded at 60° C. and a rotation speed of 60 to 75 rpm for 7 minutes and 50 seconds, and thus a first compounding composition was obtained.

The first compounding composition, sulfur, and vulcanization accelerator (TBBS) were added to a Banbury mixer and kneaded for 2 minutes at 50 rpm at 50° C., and thus a rubber composition was obtained.

The ratios of raw materials used in the above-described compounding are shown in Tables 1 and 2 below. Table 1 shows the ratios of raw materials introduced according to the above process, and Table 2 shows the ratios of components included in finished rubber compositions.

N234: iodine adsorption amount: 113 to 127 mg/g, DBP oil absorption amount: 118 to 132 ml/100 g N134: iodine adsorption amount: 114 to 128 mg/g, DBP oil absorption amount: 124 to 140 ml/100 g

TABLE 1

| Classification | Comparative Example | Example 1 | Example 2 | Example 3 | Example 4 |
|---|---|---|---|---|---|
| E-SBR | 42.4 | 39.9 | 38.2 | 34.0 | 29.7 |
| TDAE oil | 24.4 | 22.2 | 20.7 | 17.0 | 13.3 |
| Zinc oxide | 1.3 | 1.3 | 1.3 | 1.3 | 1.3 |
| Stearic acid | 0.8 | 0.8 | 0.8 | 0.8 | 0.8 |
| Carbon black (N234) | 21.2 | 21.2 | 21.2 | 21.2 | 21.2 |
| Carbon black (N134) | 8.5 | 7.2 | 6.4 | 4.2 | 2.1 |

TABLE 1-continued

| Classification | Comparative Example | Example 1 | Example 2 | Example 3 | Example 4 |
|---|---|---|---|---|---|
| Masterbatch | 0 | 6.0 | 10.1 | 20.2 | 30.2 |
| Sulfur | 0.7 | 0.7 | 0.7 | 0.7 | 0.7 |
| TBBS | 0.6 | 0.6 | 0.6 | 0.6 | 0.6 |
| Total | 100 | 100 | 100 | 100 | 100 |

(Units: % by weight)

TABLE 2

| Classification | Comparative Example | Example 1 | Example 2 | Example 3 | Example 4 |
|---|---|---|---|---|---|
| E-SBR | 42.4 | 42.4 | 42.4 | 42.4 | 42.4 |
| TDAE oil | 24.4 | 24.4 | 24.4 | 24.4 | 24.4 |
| Zinc oxide | 1.3 | 1.3 | 1.3 | 1.3 | 1.3 |
| Stearic acid | 0.8 | 0.8 | 0.8 | 0.8 | 0.8 |
| Carbon black (N234) | 21.2 | 21.2 | 21.2 | 21.2 | 21.2 |
| Carbon black (N134) | 8.5 | 7.2 | 6.4 | 4.2 | 2.1 |
| Carbon nanotube | 0 | 1.3 | 2.1 | 4.2 | 6.4 |
| Sulfur | 0.7 | 0.7 | 0.7 | 0.7 | 0.7 |
| TBBS | 0.6 | 0.6 | 0.6 | 0.6 | 0.6 |
| Total | 100 | 100 | 100 | 100 | 100 |

(Units: % by weight)

Referring to the above Table 2, the rubber compositions of Examples and Comparative Example had the same filler (carbon black and carbon nanotubes) content of 70 parts by weight (PHR) relative to 100 parts by weight of E-SBR, but unlike the Comparative Example, a part of carbon black (N134) of was replaced with carbon nanotubes in Examples, and the percentages of carbon black replaced by carbon nanotubes were differently set in Examples 1 to 4.

The obtained rubber compositions were formed into sheets having a thickness of 2 mm using a roll mixer set at 50° C. and subjected to crosslinking in a hot press set at 160° C. while applying a pressure of 160 kgf/cm² or more. The crosslinking time was measured with a rubber process analyzer. The processability, curing characteristics mechanical properties, and dynamic properties of the crosslinked specimen were evaluated and are shown in the following Table 3.

TABLE 3

| Classification | Comparative Example | Example 1 | Example 2 | Example 3 | Example 4 |
|---|---|---|---|---|---|
| Mooney viscosity (@100° C.) | 73.1 | 79.2 | 83.1 | 90.4 | 95.8 |
| $T_{10}$ (min) | 5.53 | 5.62 | 5.81 | 5.93 | 6.10 |
| $T_{90}$ (min) | 20.71 | 21.32 | 22.11 | 22.57 | 22.89 |
| Hardness (Shore-A) | 62 | 66 | 68 | 69 | 72 |
| Modulus at 100% elongation (kgf/cm²) | 23.5 | 31.3 | 35.7 | 43.5 | 50.1 |
| Modulus at 300% elongation (kgf/cm²) | 132 | 132 | 141 | 153 | 161 |
| Tensile strength (kgf/cm²) | 240 | 256 | 260 | 261 | 255 |
| Tensile elongation (%) | 521 | 535 | 541 | 544 | 540 |
| Tg (° C.) | −5.9 | −4.3 | −4.5 | −4.3 | −4.4 |
| Tanδ (@Tg) | 0.8407 | 0.8008 | 0.7845 | 0.7764 | 0.7579 |
| Tanδ (@0° C.) | 0.7163 | 0.7014 | 0.7153 | 0.7266 | 0.7312 |
| E" (@25° C.) | 6.6143 | 8.6337 | 11.8 | 14.5 | 17.9 |
| Tanδ (@60° C.) | 0.2049 | 0.2341 | 0.2559 | 0.2711 | 0.2923 |

Referring to the above Table 3, it can be seen that as the carbon nanotube content of a rubber composition increased, the viscosity of the rubber composition increased and $T_{10}$ and $T_{90}$ measured with a rubber process analyzer (which measures a crosslinking time by monitoring torque values over time at about 160° C., wherein the crosslinking time is usually determined based on 90% of the maximum torque ($T_{90}$)) increased. Therefore, it can be seen that in the case of the rubber compositions and specimens manufactured by the above-described process, although processability was slightly reduced, a satisfactory level of carbon nanotube dispersibility was achieved.

In regard to the mechanical properties of the specimen measured by a universal testing machine (UTM), all of modulus at 100% and 300% elongation, tensile strength, and tensile elongation of Examples were improved as compared to those of Comparative Example.

In addition, the dynamic properties of the specimens were evaluated by dynamic mechanical analysis (DMA). Among these, a tan δ value at 60° C. is related to fuel economy characteristics, and the larger the tan δ value at 60° C., the higher a loss modulus value by definition and thus the lower the fuel economy characteristics. This means that rolling resistance is increased, and this phenomenon occurs because the heating value and heating rate of the rubber specimens increase due to the inclusion of carbon nanotubes.

Referring to the dynamic property test results obtained from the specimens of Examples and Comparative Example, the tan δ value at 60° C. steadily increased as carbon nanotube content increased. This is because as a tire rotates, external stress is transmitted to the carbon nanotubes present in the rubber matrix, and accordingly, the carbon nanotubes which do not form any bonds with the molecular chains of the rubber components vibrate, generating heat.

In addition, the loss modulus (E") represents grip properties on a road surface, and it is considered that the larger the loss modulus value, the better the grip properties. From the results showing that the E" value increased as carbon nanotube content increased, it can be seen that the inclusion of carbon nanotubes can also improve the grip properties of a tire.

As shown in the above, carbon nanotubes can impart significantly improved heat generation characteristics, dynamic properties, and grip properties to tires, and these tires can be used as racing tires in which dynamic properties and dynamic performance are considered much more important than fuel economy characteristics.

The above description of the present invention is only for illustrative purposes, and those of ordinary skill in the art to which the present invention pertains should understand that the present invention can be easily implemented in other specific forms without changing the technical spirit or essential features of the present invention. Accordingly, it should be understood that the exemplary embodiments described above are illustrative and non-limiting in all respects. For example, each component described in a combined form may be implemented in a distributed manner, and similarly, a component described as being distributed may also be implemented in a combined form.

The scope of the present invention is indicated by the appended claims, and all changes or modified forms derived from the meaning and scope of the claims and equivalent concepts thereof should be construed as being included in the scope of the present invention.

The invention claimed is:

1. A racing tire rubber composition comprising:
rubber at 30 to 60% by weight;
carbon black at 10 to 30% by weight;
carbon nanotubes at 1 to 20% by weight; and
an oil at 10 to 50% by weight,
wherein the carbon black includes:
  first carbon black having an iodine adsorption amount of 100 to 130 mg/g and a dibutyl phthalate (DBP) oil absorption amount of 115 to 135 ml/100 g; and
  second carbon black having an iodine adsorption amount of 120 to 140 mg/g and a DBP oil absorption amount of 120 to 145 ml/100 g, and
wherein, in the carbon black, the first carbon black and the second carbon black are mixed in a weight ratio of 1:0.05 to 0.5.

2. The racing tire rubber composition of claim 1, wherein the rubber is one selected from the group consisting of acrylonitrile-butadiene rubber, ethylene-propylene-diene rubber, styrene-butadiene rubber, butadiene rubber, natural rubber, isoprene rubber, butyl rubber, and a combination of two or more thereof.

3. The racing tire rubber composition of claim 1, wherein the carbon nanotubes are bundle-type carbon nanotubes in which a plurality of multi-walled carbon nanotubes having an average diameter of 5 to 50 nm are aggregated in a lengthwise direction.

4. The racing tire rubber composition of claim 3, wherein the bundle-type carbon nanotubes have an average bundle diameter of 0.1 to 10 μm and an average bundle length of 10 to 200 μm.

5. The racing tire rubber composition of claim 3, wherein the multi-walled carbon nanotubes have a Raman spectral intensity ratio ($I_G/I_D$) of 0.5 to 1.5.

6. The racing tire rubber composition of claim 3, wherein the multi-walled carbon nanotubes have an apparent density of 0.005 to 0.120 g/ml.

7. The racing tire rubber composition of claim 3, wherein the multi-walled carbon nanotubes have a carbon (C) content of 90% by weight or more.

8. A method of manufacturing a racing tire rubber composition, comprising:
  (a) preparing a masterbatch by mixing 100 parts by weight of a first rubber with 10 to 100 parts by weight of carbon nanotubes and 50 to 500 parts by weight of an oil; and
  (b) diluting the masterbatch by mixing the masterbatch with a second rubber, carbon black, and an oil so that a carbon nanotube content of the rubber composition is 1 to 20% by weight,
wherein the carbon black includes:
  first carbon black having an iodine adsorption amount of 100 to 130 mg/g and a dibutyl phthalate (DBP) oil absorption amount of 115 to 135 ml/100 g; and
  second carbon black having an iodine adsorption amount of 120 to 140 mg/g and a DBP oil absorption amount of 120 to 145 ml/100 g, and
wherein, in the carbon black, the first carbon black and the second carbon black are mixed in a weight ratio 1:0.05 to 0.5.

9. The method of claim 8, wherein the first rubber and the second rubber are one selected from the group consisting of acrylonitrile-butadiene rubber, ethylene-propylene-diene rubber, styrene-butadiene rubber, butadiene rubber, natural rubber, isoprene rubber, butyl rubber, and a combination of two or more thereof.

10. The method of claim 8, wherein the carbon nanotubes are bundle-type carbon nanotubes in which a plurality of multi-walled carbon nanotubes having an average diameter of 5 to 50 nm are aggregated in a lengthwise direction.

11. The method of claim 10, wherein the bundle-type carbon nanotubes have an average bundle diameter of 0.1 to 10 μm and an average bundle length of 10 to 200 μm.

12. The method of claim 10, wherein the multi-walled carbon nanotubes have a Raman spectral intensity ratio ($I_G/I_D$) of 0.5 to 1.5.

13. The method of claim 10, wherein the multi-walled carbon nanotubes have an apparent density of 0.005 to 0.120 g/ml.

14. The method of claim 10, wherein the multi-walled carbon nanotubes have a carbon (C) content of 90% by weight or more.

* * * * *